Patented Apr. 22, 1930

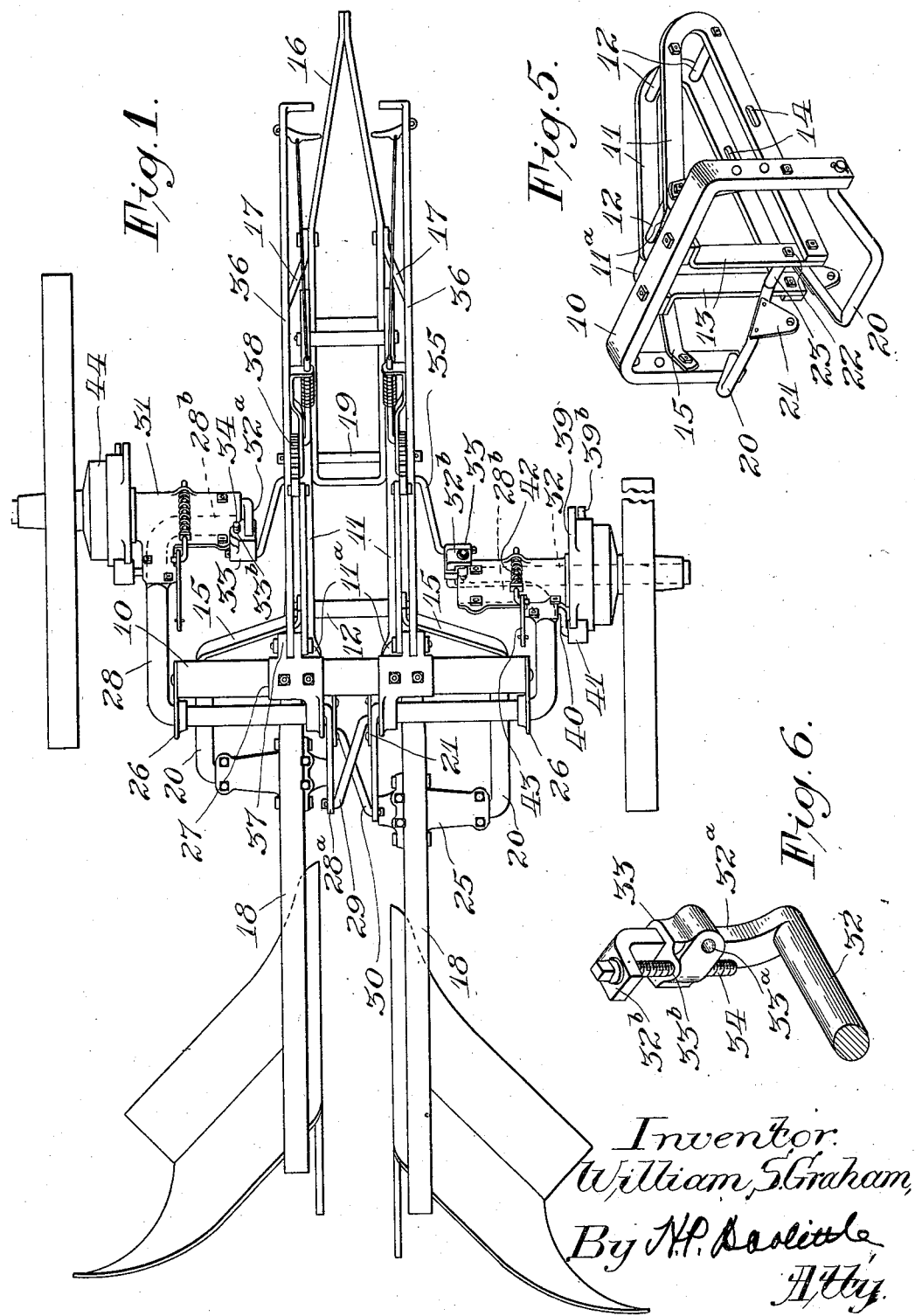

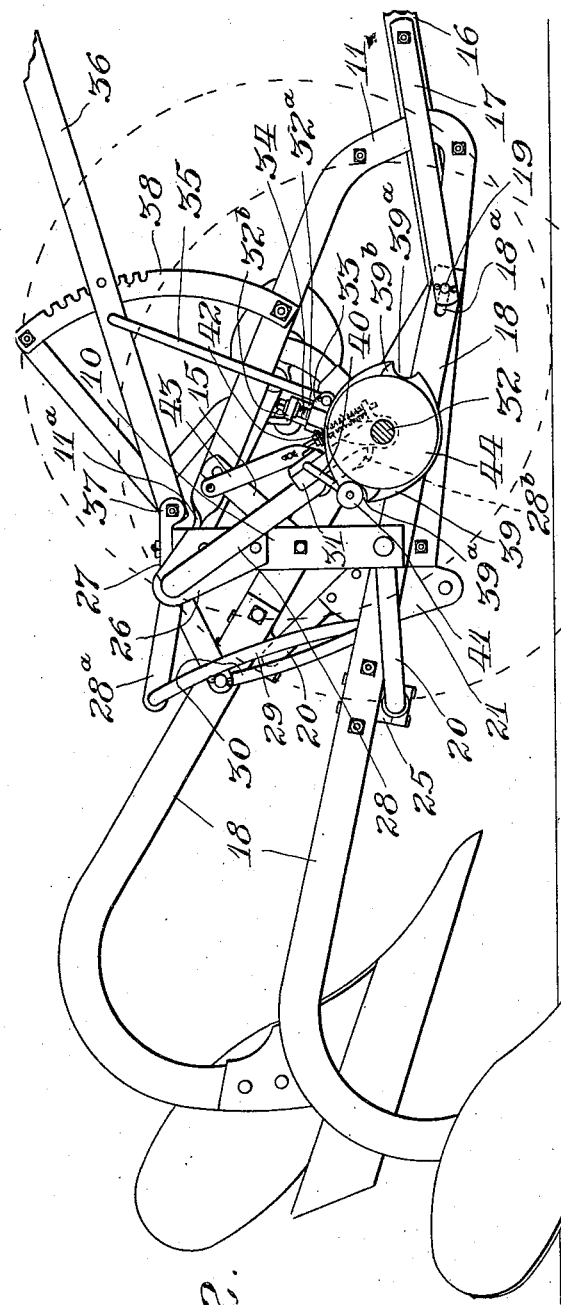

1,755,819

UNITED STATES PATENT OFFICE

WILLIAM S. GRAHAM, OF CANTON, ILLINOIS, ASSIGNOR, BY MESNE ASSIGNMENTS, TO FRED GERLACH AND ARNOLD B. KELLER, TRUSTEES, BOTH OF CHICAGO, ILLINOIS

TWO-WAY TRACTOR PLOW

Application filed April 17, 1922. Serial No. 553,521.

This invention relates to the wheel plows of the two-way or hillside type and more particularly to improvements in means for lifting and lowering the plows.

The objects of the invention are to construct a plow of this type with separate vertically adjustable wheels so that one wheel can run in the furrow and the other on the land and to provide lift mechanism so connected to the respective plows and wheels that raising and lowering of the land wheel while plowing will simultaneously raise and lower the plow that is working, and also to provide a plow of this type with traction actuated lift devices for effecting this action.

Another object of the invention is to provide the plow with a novel form of hitch which will act to transmit the draft directly to the beam of the plow which is lowered or working.

A further object is to provide a power lift mechanism embodying a novel form of adjustment by which the range of movement of the lever and plows during action of the lift may be varied, as claimed in Patent 1,632,128, June 14, 1927, divided from this application.

The foregoing objects are accomplished by the construction and arrangement of parts, or their equivalents, hereinafter specifically described and defined in the claims.

Referring to the drawings forming a part of this specification—

Fig. 1 is a plan view of a plow embodying the invention;

Fig. 2 is a side elevation;

Fig. 3 is an enlarged plan view of the forward part of the plow frame and hitch member.

Fig. 4 is a detail view of the hitch connection shown in Fig. 3 illustrating the positions of the elements when one plow beam is lowered.

Fig. 5 is a detail perspective view of the frame; and

Fig. 6 is an enlarged detail view of the adjusting device on the lifting crank.

In the present embodiment of my invention, the plow is composed of an arch 10 to which is secured a pair of forwardly extending V-shaped frame members 11 spaced apart by suitable bolts and spacing sleeves 12. The upper ends of members 11 are twisted as at 11ª so as to engage the under part of the arch 10, and the lower portions of the members 11 are connected to upright members 13 secured beneath the arch 10 and extending downwardly therefrom. Horizontal slots 14 are provided in the members 11 for a purpose to be described and the end of each frame member and the arch are connected together by diagonal braces 15 as best seen in Fig. 1. A pivoted hitch member 16 preferably formed of a single bar bent into U-shaped form with the outer ends of its arms in contact, fits snugly between the two frame members 11 and straps 17 are bolted rigidly to the sides of the hitch member and extend rearwardly on the outside of the frame members. The plow beams 18 have their front ends slotted as at 18ª and are interposed between the frame members 11 and the straps 17 as best seen in Fig. 3. A suitable draft pin 19 extends through the hitch member, slots 14 in the frame members 11 and the straps on the outside of the hitch and is engaged in the slots 18ª in the ends of the plow beams. Bails 20 formed with their inner portions flattened as shown in Fig. 5 are pivotally mounted in the arms of arch member 10 and members 13, and downwardly extending plates 21 are riveted to their flattened portions. The outer portions of the bails have out-turned ends which are pivoted in the arms of the arch and the inner arms of the bails are perforated and a bolt 22 extends through these perforations as well as through the members 13. The bolt 22 has a spacing sleeve 23 thereon, the ends of which lie against the inner arms of the bails. Each bail has journaled thereon a supporting bracket 25 on which a plow beam 18 is bolted. The arch member 10 has a bearing plate 26 secured to each vertical arm thereof and another pair of plates 27 is bolted to the horizontal portion of the arch. Extending through these bearing plates are the horizontal portions of the crank axles 28. These horizontal portions have rearwardly extending arms 28ª at the inner ends and the axle crank is formed with inwardly extending portions 28ᵇ indicated in dotted lines on Fig. 1. A link 29 connects the arm 28ª on one axle with the plate 21 of the bail on the opposite side of the frame and another link 30 connects the other arm 28ª with the plate 21 on the other bail, thereby linking each axle to the bail and plow at the opposite side of the frame. The lower and inwardly turned ends 28ᵇ of the axle cranks have bearing brackets 31 clamped thereto in which are journaled clutch shafts 32 as shown in dotted lines in Fig. 1. Each clutch shaft is formed with a crank arm 32ª on its inner end which has an inturned tip as indicated at 32ᵇ Fig. 6. On each arm 32ª there is slidably mounted a block 33 which has a horizontal opening 33ª and a vertical opening 33ᵇ. The vertical opening is threaded to receive an adjusting screw 34 which extends through an opening in the inturned tip of the crank arm on which it is held in position by a flanged wrench receiving head. The lifting links 35 have one end pivotally mounted in the openings 33ª and the other ends pivoted to adjusting levers 36 which are pivoted on the frame by means of lugs 37 formed on the members 27 and these levers are locked in adjusted position by means of the racks 38 secured on the frame, each lever being equipped with the usual detent for engaging the teeth of the rack. The crank portion 32ª of the respective shafts are offset laterally so that the links 35 will assume the proper position in alignment with the axis of shafts 32 when the clutch dogs are disengaged from the clutch wheel at the termination of the raising and lowering movement. Each clutch mechanism consists of a plate 39 fixed on shaft 32 and formed with oppositely arranged notches 39ª as well as oppositely arranged clutch dogs 39ᵇ and a trip 40 is mounted on each bracket 31 and provided with a roller 41 positioned to engage the notches 39ª and likewise the clutch dogs 39ᵇ the ends of which project at each of the notches. A spring 42 engages an upright arm 43 on the trip and a lug on the bracket 31 acts to press the roller 41 toward the clutch plate 39. Each upright arm 43 has a trip rope secured thereto through which actuation of the clutch is controlled. Each clutch also comprises a casing 44 which is fixed to the wheel to rotate therewith on shaft 32 and which has internal notches formed on its annular flange with which the inner ends of the clutch dogs 39ᵇ are adapted to engage when released by actuation of the trip 40.

The clutch plate 39 is keyed or otherwise fixed to the power shaft 32 and it follows that when the clutch dogs are engaged with the teeth on casing 44 that the wheel and shaft will rotate in unison until the trip roller 41 falls into the opposite notch and that the power shaft and its crank arm will be given a half revolution at each actuation of the clutch, thereby shifting the supporting wheel in opposite directions alternately.

As the clutch mechanism is not materially different from similar devices known to the art, it is believed that more extended description of this device is unnecessary, it being understood that either axle will be alternately shifted upwardly and downwardly at each successive actuation of its clutch and that such shifting of the axle results in shifting the plow on the opposite side of the frame in a reverse direction through connection of the links 29—30 with the bails. By adjustment of the screw 34, the pivot point of the link 35 on the crank arm 32ª can be shifted radially and the effective throw of the crank arm thereby varied with corresponding variation in the lifting and lowering range of movement of the wheels and consequently in the plowing depth.

Further adjustment to regulate the positions of the plows relatively to the ground is possible by adjustment of the levers 36 by which the wheels and plows may be raised and lowered without affecting the throw of the power lift clutch.

In operation, after the first furrow has been opened, the plow would assume the position shown in Fig. 2 and the operator, on reaching the end of the field, would trip the clutch on the land wheel. This would cause that wheel to swing downwardly to an extent which is usually adjusted to be equal to the depth of plowing, probably six inches, and the arm 28ª on the axle will swing upwardly carrying with it the bail 20 on the opposite side of the frame on which the plow that has just been working is carried. This movement of the crank axle and bail will cause this plow to be elevated to the position of the other plow at which time the hitch 16, which is connected at its front end to the tractor, will be brought into contact with the lower spacing bolt 12, thus preventing rearward tilting of the frame by the weight of the plows, and the operator is then ready to turn his machine into position for the return furrow when he will trip the clutch on the opposite wheel which then becomes the land wheel, thereby causing the opposite plow to be lowered to the plowing depth and leveling the frame. It is important to note that as each bail 20 swings upwardly and downwardly to raise and lower the plow beams, each beam will be given a slight movement longitudinally, that is, as the bail is substantially in horizontal position when the plow is down, upward movement of the bail will cause the beam to move forwardly and downward movement will cause it to move rearwardly and this movement results in releasing each beam from the hitch when raising due to the fact that the slot 18ª in the end of each beam will allow the beam to slide forwardly as it is being raised until in the relative position shown in Fig. 3, and reverse movement will cause the end of the slot 18ª to come in contact with the draft element or pin 19 when the beam moves rearwardly as a plow is lowered and the parts assume the positions shown in Fig. 4 where the right hand, or lower, plow is down. In this manner practically the full draft power is applied directly to the lowered beam, as the slots 18ª in the frame members allow the draft pin 19 to draw back with the lowered beam, (Fig. 4) and allow the pin to move forwardly to the ends of slots 18ª when the plows are raised, when the draft will be transmitted equally to both frame members 11, (see Fig. 3).

The illustrative plow is primarily adapted for tractor operation, and in such operation the draft or hitch device 16 is secured to the drawbar of a tractor. Inasmuch as the drawbar is fixed relative to the tractor, the drawbar and the draft device 16 may be considered as fixed elements in so far as any relative movement of the plow beams and the plow frame are concerned. This is to be borne in mind in connection with the following described operation.

In Figure 3 of the drawings, the draft device, including the bars 16 and 17 and the pin 19, is shown in its relation to the plow beams when the latter are both in elevated, or inoperative position. It will be noted that the draft pin 19 is intermediate the ends of each slot 18ª in the plow beams 18. Hence, draft is not directly applied to either plow beam. When the parts are in this position, the pin 19 contacts with the frame members 11 at the forward ends of the slots 14 in those members. In this case, draft is directly applied to the forward end of the frame.

Figure 4 illustrates the condition of the parts shown in Figure 3 when one plow beam has been lowered to operative position. It is to be especially noted in connection with Figure 4 that the draft pin 19 is engaging the lower plow beam 18 at the forward end of its slot 18ª, and that the draft pin is not engaging the frame members 11 at either end of their slots 14. The draft pin 19 is shown intermediate the ends of the slots 14. If the draft device, including the members 16 and 17, is considered a fixed structure, it is obvious then that the lower plow beam 18 must have been moved rearwardly and the frame including the members 11 must have been moved forwardly, (with reference to their positions as shown in Figure 3), in order that the situation illustrated in Figure 4 might be brought about. The illustrative plow controlling apparatus accomplishes such results.

If both plow beams be considered to be in the elevated position illustrated in the upper part of Figure 2, when the beam nearest the observer is being lowered, the journal bracket 25 moves through an arc in such a manner that its horizontal distance from the upright frame member 10 increases; in other words, the plow beam is shifted rearwardly until it contacts at the forward end of its slot 18ª with the draft pin 19. Thereafter, and while the lowering movement of the crank 20 is being completed, there is a movement of the parts to position the pin 19 intermediate the ends of the slot 14, as illustrated in Figure 4. Inasmuch as the draft device is rigidly attached to the tractor, it is not to be considered as being moved rearwardly. The frame, including the members 11, therefore, must move forwardly to bring about the relation of the parts illustrated in Figure 4. The last part of the downward movement of the crank 20 moves the frame forwardly so that draft is not directly applied to the frame.

When the above mentioned plow beam is elevated, it first moves forward of its position shown in Figure 4, so that it is moved out of contact with the pin 19 at the forward end of its slot 18ª. Further upward movement of the crank 20 and the plow beam permits the draft device to move forward relative to the frame members 11, so that the pin 19 engages those members at the forward ends of their slots 14.

It will be seen by the above description that I have provided a simple and efficient mechanism for the purpose set forth and that while I have disclosed a specific embodiment of the invention, changes within the scope of the following claims are capable of being made.

I claim as my invention:

1. A plow having adjacent plow bottoms for alternate use, comprising two separately vertically shiftable plow beams, each beam carrying one of said plow bottoms, a plow frame, a supporting wheel adjacent each beam, and plow adjusting connections between each beam and the supporting wheel adjacent the other beam whereby when the frame is moved relative to one supporting wheel the beam adjacent the other wheel is caused to have movement relative to the frame.

2. A plow having adjacent plow bottoms for alternate use, comprising a frame, separate and independently vertically shiftable plow beams carried by said frame, supporting wheels for the frame, a plurality of plow elevating and lowering structures said structures operatively overlapping each other and each comprising a set of operatively jointed elements, each of said structures connecting one supporting wheel with a relatively remote plow beam for shifting that beam relative to the frame simultaneously with the shifting of the wheel connected thereto by said set of elements.

3. A plow comprising a plow frame, a pair of separate vertically shiftable plow beams arranged side by side, a vertically shiftable supporting wheel adjacent each beam, means for raising and lowering each wheel, and connections between each wheel and the plow beam adjacent the other wheel comprising means for shifting said beam in opposite direction to the wheel as it is raised or lowered.

4. A plow comprising a frame, a pair of separate plows mounted to be vertically shiftable in the frame, a vertically shiftable supporting wheel mounted on each side of the frame, and means connecting each plow and the opposite wheel respectively, including means for shifting each plow and opposite wheel in opposite directions on the frame.

5. A plow comprising a frame, a pair of swinging bails mounted in the frame, one on each side of its longitudinal median line, a plow beam carried by each bail, a crank axle journaled on each side of the frame, supporting wheels on the axles, means for giving either axle a partial turn at will, and connections between each axle and a bail for swinging said bail on rotation of the axle.

6. A plow comprising a frame, a pair of vertically swinging bails mounted in the frame one on each side of its longitudinal median line, a plow beam carried by each bail, a crank axle journaled on each side of the frame, each axle having bail shifting means on its inner end connected to the bail on the opposite side of the frame, supporting wheels on the axles, and means for giving either axle a partial turn at will thereby swinging said opposite bail and shifting one of the plows.

7. A plow comprising a frame, a pair of separate vertically shiftable plow beams arranged side by side in the frame, a rockable crank axle journaled on each side of the frame, supporting wheels thereon, a beam shifting device connecting the inner end of each axle to the plow beam on the opposite side of the frame including means for shifting the beam in opposite direction to movement of the axle crank, and means for shifting each axle and wheel.

8. A plow comprising a frame, a pair of swinging bails mounted in the frame one on each side of the longitudinal median line, a plow beam carried by each bail, a cranked axle journaled on each side of the frame, supporting wheels on the cranks, bail rocking links connecting each axle with the bail on the opposite side of the frame, and means for shifting each crank to raise and lower its respective wheel.

9. In a two way plow having adjacent plow bottoms for alternate use, a pair of relatively vertically movable plow beams, independent means for moving each beam vertically and simultaneously shifting it forwardly or rearwardly, a draft device connecting the forward ends of the beams including an element substantially at right angles to the line of draft, and lost motion connections between each beam and said device permitting either beam to move forwardly relative to said draft device when that beam is raised.

10. In a two way plow having adjacent plow bottoms for alternate use, two vertically swinging bails, a plow beam carried by each bail and connected to each plow bottom, independent means for swinging each bail to raise or lower the plow beam associated therewith, each bail being in approximately horizontal position when its beam is lowered, and a draft device connected to the forward ends of the beams and including a draft element substantially at right angles to the line of draft, the forward ends of the plow beams being slidably and pivotally connected to said draft device.

11. In a two way plow having adjacent plow bottoms for alternate use, a frame having forwardly extending spaced members, a plow beam carried by the frame for each plow bottom, independent means for vertically shifting each beam, said independent means including a bail for each plow beam by means of which a beam is pushed forward as it is elevated, a draft device connected to the forward ends of the beams and positioned between the forward ends of the spaced members of the frame so as to be held against lateral movement by contact therewith, the draft being applied to the lowered beam only by reason of the forward movement of the other beam as it is elevated.

12. In a two way plow having adjacent plow bottoms for alternate use, a frame having forwardly extending spaced members, a plow beam carried by the frame for each plow bottom, independently operable means for vertically shifting the plow beams, said means including independently operable bails for moving a beam forwardly or rearwardly as it is elevated or lowered respectively, a draft device positioned between the forward ends of the spaced members and held against lateral movement by contact therewith, the forward end of each plow beam having a pivotal and a sliding connection with the draft device.

13. In a two way plow having adjacent plow bottoms for alternate use, a frame, a plow beam carried by the frame for each plow bottom, independently operable plow controls for selectively shifting the plow beams, and draft structures connected to the forward ends of the plow beams and movably related to the plow beams for directly applying draft power to the lowered beam only.

14. In a two way plow having adjacent plow bottoms for alternate use; a supporting frame; a plow beam carried by the frame for each plow bottom; raising and lowering devices for acting upon each beam independently; a draft device connected to the frame and to the beams; and relatively changeable connections between said beams, said draft device, and said frame for causing the point at which the draft is applied to the plow to shift from the frame to a beam when the latter is lowered to working position.

15. A plow frame comprising an upright U-shaped primary member having its legs extending downwardly from its bight, parallel and downwardly extending bars rigidly secured at their upper ends to the primary member, each of said bars cooperating with a leg of the primary member to afford a plow bail support, and spaced forwardly extending members for supporting the forward end of a plow beam, said members being rigidly secured to the primary member.

16. A frame for a wheeled plow comprising a primary member having a plurality of parallel and downwardly extending bar members rigid therewith, and forwardly extending reversely bent plow beam supporting elements rigidly secured at their rear ends to said primary member.

17. A frame for a wheel plow comprising a primary member having a plurality of parallel and vertical legs depending therefrom and rigidly secured thereto, a plow elevating and lowering bail pivoted to two of said legs, and forwardly extending members rigidly secured to said primary member for guiding the forward ends of plow beams and governing the application of draft.

18. A two-way tractor plow comprising, in combination, separate vertically movable plow bottoms, supporting wheels, a frame structure, a crank axle for each supporting wheel rotatably mounted on the frame, a bail for each plow bottom pivoted to the frame below the crank axle mounting, and means for connecting each crank axle with a bail to lift a plow bottom when a crank axle is turned.

19. A two-way plow comprising, in combination, a frame, supporting wheels, plow beams pivotally related to the frame, a crank axle for each wheel journaled to the frame and connecting a supporting wheel to the frame, means for swinging a crank axle to raise or lower the frame, and connections between each crank axle and a plow beam for raising the beam relative to the frame while the frame is being raised and for lowering the beam relative to the frame while the frame is being lowered.

20. A plow comprising, in combination, a plow frame, a pair of separate vertically shiftable plow beams arranged side by side, a supporting wheel at each side of the frame, a movable support connecting each wheel with the frame, means for shifting a support to raise the frame and connections between each wheel and the plow beam adjacent the other wheel comprising means for raising that beam as the support is shifted.

21. A two-way plow comprising, in combination, a frame, two separately vertically shiftable plow beams located alongside each other, a right hand supporting wheel, a left hand supporting wheel, a separate crank axle connecting each supporting wheel with the frame, separate lift mechanisms for shifting the crank axle of either wheel for raising the corresponding side of the frame, and mechanisms between the crank axle of the right hand wheel and the left hand plow beam and between the crank axle of the left hand wheel and the right hand plow beam for raising that beam relative to the frame while the said frame lift mechanism is raising the opposite side of the frame.

22. A plow comprising a frame, a pair of separate plows mounted so as to be separately vertically shiftable on the frame, a supporting wheel on each side of the frame, a shiftable support connecting each supporting wheel with the frame, means for shifting a wheel support so as to raise or lower the frame relative to the horizontal plane of the axis of the wheel, and connections between one plow and the remote supporting wheel, said connections comprising means for raising the frame on the one supporting wheel and simultaneously raising the remote plow relative to the frame.

23. A plow comprising, in combination, a frame having an upright structure, a pair of swinging bails mounted on the frame, one on each side of the longitudinal median line of the plow, a plow beam pivotally associated with each bail, a crank axle journaled on the upright structure at each side of the frame, supporting wheels on the axles, means for giving either axle a partial turn, and connections between each axle and a bail for swinging the bail on turning of the axle.

24. A plow comprising, in combination, an upright transversely extending frame, a supporting wheel adjacent each end of the frame, a rotatable axle secured to each wheel, a U-shaped crank axle having one arm journaled upon said frame and its other parallel arm extending inwardly positioned forwardly with respect to the frame and rotatably supporting one of said rotatable axles, a similar crank axle upon the opposite side of said frame, plow bodies located rearwardly of the frame and respectively connected to a crank axle so as to be moved as a consequence of movement of the crank axle, plow beams of said plow bodies extending forwardly through said frame and pivoted forwardly thereof, plow beam guiding members extending forwardly of and centrally located with respect to said frame, and adjusting mechanism carried by said guiding members and connected to the inner ends of the forward arms of the U-shaped crank axles for selectively moving either of said arms upwardly or downwardly within the longitudinal vertical confines of said frame.

25. A plow comprising, in combination, a wheel supported frame, independently vertically movable plow bodies carried by said frame, a draft device connected to said frame by a lost motion connection, beams on said plow bodies having lost motion connections with the draft device, and means for moving the beams and frame on said lost motion connections to the draft device during vertical movements of the plow bodies whereby when said plow bodies are in their upper positions the draft is applied directly to the frame and when a plow body is lowered to operative position that plow body is first moved rearwardly with respect to the draft device and the frame to take up some of the lost motion in said connection and thereafter the frame is moved forwardly with respect to the plow body so that draft transmitted by the draft device is applied directly only to that plow body which is in lowered position.

26. A plow comprising, in combination, a wheel supported frame, a plow body carried behind the frame, a central forward extension rigid with respect to the frame, a vertically swingable draft device having a transverse pivotal connection with said extension, means for elevating and lowering the plow body with respect to the frame and the draft device, and a stop on the extension for contacting with the draft device to limit rearward tilting of the frame when the plow body is elevated to inoperative position.

27. A plow comprising, in combination, a transversely extending upright wheel supported frame, a plow beam extending through said frame, means carried by the frame for transmitting elevating and lowering movements to the beam, a draft device carried by the frame and having a lost motion connection with the frame and beam and means comprised in said elevating and lowering means for so moving the plow beam on the frame that draft is transmitted directly only to the frame when the beam is elevated and directly only to the beam when the beam is lowered.

28. A plow comprising, in combination, an upright transversely extending frame, a supporting wheel adjacent each end of the frame, a rotatable axle secured to each supporting wheel, a crank axle pivotally supported upon said frame and having an arm extending inwardly with respect to one end of the frame and rotatably supporting one of said rotatable axles, a similar crank axle upon the opposite side of said frame, a plow body adjacent each of said crank axles located rearwardly of the frame, means connecting each plow body to a crank axle so that the plow body will be moved as a consequence of the movement of a crank axle, plow beams included in said means and secured to said plow body and extending forwardly through said frame, supporting members extending forwardly of said frame, and controlling mechanism connected to said members and connected to the inner ends of the forward arms of the crank axles for selectively moving either of said arms upwardly or downwardly within the longitudinal vertical confines of said frame.

In testimony whereof I affix my signature.
WILLIAM S. GRAHAM.